US010029668B2

(12) United States Patent
Aikawa

(10) Patent No.: US 10,029,668 B2
(45) Date of Patent: Jul. 24, 2018

(54) CONTROL APPARATUS FOR INTERNAL COMBUSTION ENGINE

(71) Applicant: TOYOTA JIDOSHA KABUSHIKI KAISHA, Toyota (JP)

(72) Inventor: Hidefumi Aikawa, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 237 days.

(21) Appl. No.: 14/899,026

(22) PCT Filed: Jul. 4, 2013

(86) PCT No.: PCT/JP2013/068440
§ 371 (c)(1),
(2) Date: Dec. 16, 2015

(87) PCT Pub. No.: WO2015/001654
PCT Pub. Date: Jan. 8, 2015

(65) Prior Publication Data
US 2016/0121875 A1  May 5, 2016

(51) Int. Cl.
*B60W 20/10* (2016.01)
*B60W 10/06* (2006.01)
(Continued)

(52) U.S. Cl.
CPC ............. *B60W 20/10* (2013.01); *B60K 6/445* (2013.01); *B60W 10/06* (2013.01); *B60W 10/08* (2013.01);
(Continued)

(58) Field of Classification Search
CPC ...... B60W 20/40; B60W 10/08; B60W 20/00; B60W 20/10; B60W 10/06;
(Continued)

(56) References Cited

U.S. PATENT DOCUMENTS

2003/0144773 A1* 7/2003 Sumitomo ............. B60K 6/442
701/22
2009/0012665 A1* 1/2009 Brennan ................. B60L 1/003
701/22
(Continued)

FOREIGN PATENT DOCUMENTS

JP  3783548 B2  6/2006
JP  2011-236871 A  11/2011

OTHER PUBLICATIONS

International Search Report dated Jul. 30, 2013, for PCT/JP2013/068440 Filed Jul. 4, 2013.

*Primary Examiner* — Mussa A Shaawat
(74) *Attorney, Agent, or Firm* — Oblon, McClelland, Maier & Neustadt, L.L.P.

(57) ABSTRACT

An apparatus for controlling an internal combustion engine in a hybrid vehicle is provided with: a specifying device configured to specify the operation aspect at a previous stop time point of the internal combustion engine in an EV running period; a first start controlling device configured to start the internal combustion engine in the cylinder deactivation operation at a time point at which a required output corresponding value of the hybrid vehicle is a first reference value, if the specified operation aspect is the cylinder deactivation operation; and a second start controlling device configured to start the internal combustion engine in the full cylinder operation at a time point at which the required output corresponding value is a second reference value, which is greater than the first reference value, if the specified operation aspect is the full cylinder operation.

4 Claims, 12 Drawing Sheets

(51) Int. Cl.
  *B60W 10/08* (2006.01)
  *B60K 6/445* (2007.10)
  *B60W 20/40* (2016.01)
  *B60W 20/00* (2016.01)
  *F02D 17/02* (2006.01)

(52) U.S. Cl.
  CPC ............ *B60W 20/00* (2013.01); *B60W 20/40* (2013.01); *B60W 2560/00* (2013.01); *B60W 2600/00* (2013.01); *B60W 2710/06* (2013.01); *B60W 2710/086* (2013.01); *B60Y 2300/435* (2013.01); *F02D 17/02* (2013.01); *Y02T 10/6239* (2013.01); *Y10S 903/905* (2013.01); *Y10S 903/93* (2013.01)

(58) Field of Classification Search
  CPC ........ B60W 2710/086; B60W 2560/00; B60K 6/445; B60Y 2300/435; Y10S 903/905; Y10S 903/93
  See application file for complete search history.

(56) References Cited

U.S. PATENT DOCUMENTS

| | | | |
|---|---|---|---|
| 2009/0118985 A1* | 5/2009 | Whitney | F02D 41/0087 701/105 |
| 2010/0038158 A1* | 2/2010 | Whitney | B60K 6/365 180/65.265 |
| 2011/0231071 A1* | 9/2011 | Phillips | B60K 6/485 701/54 |
| 2011/0276209 A1* | 11/2011 | Suganunna | B60W 10/06 701/22 |
| 2011/0295483 A1* | 12/2011 | Ma | F02D 41/0002 701/102 |
| 2011/0295494 A1* | 12/2011 | Ma | F02D 13/0219 701/112 |
| 2013/0047956 A1* | 2/2013 | Davis | F02P 5/152 123/406.11 |
| 2013/0073136 A1* | 3/2013 | Yamamoto | B60K 6/445 701/22 |
| 2013/0110383 A1* | 5/2013 | McDonald | F02D 41/042 701/113 |
| 2014/0156132 A1* | 6/2014 | Ichimoto | B60W 10/06 701/22 |
| 2015/0051817 A1* | 2/2015 | Murata | B60K 6/48 701/112 |
| 2015/0073632 A1* | 3/2015 | Hill | B60W 20/10 701/22 |
| 2015/0283993 A1* | 10/2015 | Takano | B60K 6/48 701/22 |

* cited by examiner

US 10,029,668 B2

CONTROL APPARATUS FOR INTERNAL COMBUSTION ENGINE

TECHNICAL FIELD

The present invention relates to a control apparatus for an internal combustion engine.

BACKGROUND ART

As this type of apparatus, there is an apparatus applied to an internal combustion engine that can perform a cylinder resting operation in a hybrid vehicle (refer to Patent Literature 1). According to the apparatus disclosed in the Patent Literature 1, if required output is less than a predetermined value when it is required to start the internal combustion engine, the internal combustion engine is started in a partially cylinder resting state, and if the required output is greater than the predetermined value, the internal combustion engine is started in a full cylinder operation.

Moreover, as an apparatus applied to a vehicle other than the hybrid vehicle, Patent Literature 2 discloses an apparatus configured to produce compression required to start an engine in one bank, while reducing a pump loss in another bank, during rotation of the engine in a self-sustaining operation stop state.

CITATION LIST

Patent Literature

Patent Literature 1: Japanese Patent Application Laid Open No. 2011-236871
Patent Literature 2: Japanese Patent No. 3783548

SUMMARY OF INVENTION

Technical Problem

Switching of an operation aspect is accompanied by the following problems.

In other words, if the operation aspect is switched in operation of the internal combustion engine, a change in combustion noise gives a driver discomfort. If the operation aspect is switched before the start of the internal combustion engine, the start of the internal combustion engine is delayed for a time required to switch the operation aspect. In particular, if a hydraulic driving apparatus is used to switch the operation aspect, a rising time of hydraulic pressure tends to become longer depending on vehicle configuration. At this time, if an electric pump or the like is separately provided in order to always maintain predetermined hydraulic pressure, the separate provision causes a reduction in fuel efficiency associated with electric power consumption, and an increase in cost. Moreover, if an electric driving apparatus is used to switch the operation aspect, the electric power consumption causes the reduction in fuel efficiency. Therefore, frequency of switching the operation aspect is preferably low.

On the other hand, the frequency of switching the operation aspect is not unrelated to the operation aspect of the internal combustion engine at a previous stop; however, this point is not considered in the apparatuses described in the Patent Literatures 1 and 2. Therefore, the internal combustion engine that can switch the operation aspect of this type tends to have high frequency of switching the operation aspect.

In view of the aforementioned technical problems, it is therefore an object of the present invention to provide a control apparatus for an internal combustion engine that can reduce the frequency of switching between the full cylinder operation and the cylinder resting operation (hereafter referred to as "cylinder deactivation operation" as occasion demands) in a hybrid vehicle that can perform EV running.

Solution to Problem

The above object of the present invention can be achieved by a control apparatus for an internal combustion engine, configured to control an internal combustion engine in a hybrid vehicle, the hybrid vehicle comprising, as a power source: the internal combustion engine that can switch an operation aspect between a full cylinder operation that allows all cylinders to be in an operating state and a cylinder deactivation operation that allows a part of the cylinders to be rested; and at least one rotary electric machine that can perform power running and regeneration, said control apparatus comprising: a specifying device configured to specify the operation aspect at a previous stop time point of the internal combustion engine in an EV running period in which the internal combustion engine is in a stop state; a first start controlling device configured to start the internal combustion engine in the cylinder deactivation operation at a time point at which a required output corresponding value of the hybrid vehicle is a first reference value, if the specified operation aspect is the cylinder deactivation operation; and a second start controlling device configured to continue EV running at a time point at which the required output corresponding value is the first reference value and to start the internal combustion engine in the full cylinder operation at a time point at which the required output corresponding value is a second reference value, which is greater than the first reference value, if the specified operation aspect is the full cylinder operation.

The internal combustion engine according to the present invention is configured to switch the operation aspect for defining a rest state of the cylinders between the full cylinder operation that allows all the cylinders to be in the operating state and the cylinder deactivation operation that allows a part of the cylinders to be rested. The switching of the operation aspect is realized by fixing an intake valve, an exhaust valve, or both intake and exhaust valves of the cylinder to be in the rest state, at a fully closed position(s), or by performing similar actions. Such control of the intake/ exhaust valve is realized, for example, by various known variable valve mechanisms.

Here, normally, there is no physical difference between the cylinders, and thus, a range of the required output corresponding value with good thermal efficiency in the cylinder deactivation operation is shifted to a lower output side than that in the full cylinder operation, by the amount of a reduction in the operating cylinders. In other words, between the full cylinder operation and the cylinder deactivation operation, there is a difference in thermal efficiency with respect to the required output corresponding value. Therefore, if the operation aspect of the internal combustion engine immediately before the stop is not reflected in a start condition, the frequency of switching the operation aspect is necessarily high.

For example, if the internal combustion engine that is stopped in the full cylinder operation is started in the full cylinder operation at a required output corresponding value on a relatively low output side to select the cylinder deactivation operation, it is necessary to switch the operation aspect to the cylinder deactivation operation immediately after the start, from a viewpoint of improving fuel efficiency. Moreover, if the required output corresponding value increases after that, it could be necessary to switch again from the cylinder deactivation operation to the full cylinder operation. Alternatively, in order that the internal combustion engine that is stopped in the full cylinder operation is started in the cylinder deactivation operation at a required output corresponding value on the relatively low output side to select the cylinder deactivation operation, it is necessary to switch the operation aspect before the start.

In contrast, according to the control apparatus for the internal combustion engine according to the present invention, the operation aspect of the internal combustion engine at the previous stop time point is reflected in the start condition of the internal combustion engine in the EV running period in which the internal combustion engine is in the stop state.

Specifically, if the internal combustion engine is stopped in the full cylinder operation, even if the required output corresponding value reaches the first reference value at which the internal combustion engine that is stopped in the cylinder deactivation operation is started, the internal combustion engine is not started, but the EV running is continued. If the internal combustion engine is stopped in the full cylinder operation, the internal combustion engine is started at the time point at which the required output corresponding value reaches the second reference value, which is greater than the first reference value.

Therefore, according to the control apparatus for the internal combustion engine according to the present invention, it is possible to reduce the frequency of switching the operation aspect, and for example, it is possible to preferably suppress discomfort caused by a change in combustion noise due to the switching of the operation aspect immediately after the start. Alternatively, it is possible to preferably suppress a start delay, a reduction in fuel efficiency, or an increase in cost when the operation aspect is switched before the start.

By the way, there is a possibility that the required output corresponding value decreases after the required output corresponding value reaches the second reference value and the internal combustion engine is started in the full cylinder operation. In this case, it is considered that it is also necessary to switch to the cylinder deactivation operation after the start in the full cylinder operation.

In the control apparatus for the internal combustion engine according to the present invention, however, the EV running period is lengthened if the internal combustion engine is stopped in the full cylinder operation. With lengthening the EV running period, the amount of electric power taken from a battery relatively increases, and a state of charge (SOC) of the battery decreases. In other words, charge/discharge balance of the battery is inclined to a discharge side.

Therefore, if the required output corresponding value decreases immediately after the internal combustion engine is started in the full cylinder operation at the second reference value, a part of output that is excessive in the full cylinder operation can be used to charge the battery by power regeneration via the rotary electric machine, while the internal combustion engine is operated on a higher output side than the required output corresponding value. In other words, the lengthened EV running period can be used to suppress the switching to the cylinder deactivation operation after the start. It is therefore possible to maintain the full cylinder operation in such a situation and to suppress the frequency of switching the operation aspect.

The effect as described above is valid even if efficiency is still higher in the cylinder deactivation operation, immediately after the start in the full cylinder operation at the second reference value. Therefore, the setting of the second reference value is relatively flexible.

In one aspect of the control apparatus for the internal combustion engine according to the present invention, wherein the first reference value is the required output corresponding value at which efficiency of the hybrid vehicle during cylinder deactivation operation HV running accompanied by the cylinder deactivation operation is greater than or equal to efficiency of the hybrid vehicle during the EV running, and the second reference value is the required output corresponding value at which efficiency of the hybrid vehicle during full cylinder operation HV running accompanied by the full cylinder operation is greater than or equal to the efficiency of the hybrid vehicle during the EV running.

According to this aspect, it is possible to efficiently run the hybrid vehicle.

The "efficiency of the hybrid vehicle" described here is an index value whose high and low values respectively correspond to low and high fuel consumption amounts of the internal combustion engine.

During the EV running, the required output is all provided by the rotary electric machine, and thus, there is no fuel consumption. However, electric power consumed during the EV running is compensated for by power generation using the power of the internal combustion engine. Therefore, if efficiency of the rotary electric machine decreases, i.e. if a power consumption amount with respect to the output increases, the fuel consumption amount of the internal combustion engine necessarily increases.

Here, the efficiency of the rotary electric machine is good on the relatively low output side, as opposed to the internal combustion engine. Therefore, during the EV running, as the required output increases, the efficiency of the rotary electric machine decreases, and the thermal efficiency of the internal combustion engine in the cylinder deactivation operation increases. The required output corresponding value corresponding to the required output that allows the fuel consumption amount to be saved more by the cylinder deactivation operation of the internal combustion engine, which comes in the above procedure, is namely the first reference value.

On the other hand, as described above, the relation between the thermal efficiency in the full cylinder operation and the thermal efficiency in the cylinder deactivation operation is reversed at a certain required output. Moreover, the efficiency during the EV running tends to decrease on a higher output side than the first reference value in many cases. Thus, on the higher output side than the first reference value, there is the required output that allows the fuel consumption amount to be saved more by the full cylinder operation of the internal combustion engine than by the continued EV running. The required output corresponding value corresponding to the required output is namely the second reference value.

The first and second reference values that correlate with the efficiency of the hybrid vehicle as described above can be determined, experimentally, experientially, or theoretically in advance. As a preferred form, the first and second reference values may be stored to be referred to in a form of a map or the like.

Moreover, each of the aforementioned efficiencies of the hybrid vehicle may be obtained at each time by arithmetic operation. For example, the efficiency during the EV running can be obtained from electric power consumption by discharging, the SOC of the battery, charge/discharge efficiency of the battery, a power regeneration amount (or a charge amount) during regenerative braking and the amount of an increase in fuel consumption amount for power generation, or the like.

In another aspect of the control apparatus for the internal combustion engine according to the present invention, further comprising a correcting device configured to increase and correct a power generation load of the rotary electric machine with respect to a reference value if the internal combustion engine is started in the full cylinder operation.

As described above, according to the control apparatus for the internal combustion engine according to the present invention, the SOC of the battery decreases with lengthening the EV running period. According to this aspect, the SOC of the battery can be recovered at an early stage by increasing the power generation load of the rotary electric machine to more actively perform charging.

Moreover, according to this aspect, the internal combustion engine in the full cylinder operation can be operated in an area with good thermal efficiency as long as possible. It is therefore possible to maintain the full cylinder operation as long as possible, thereby suppressing the switching to the cylinder deactivation operation.

In another aspect of the control apparatus for the internal combustion engine according to the present invention, wherein the required output corresponding value is a required output or a required driving force.

The required output or the required driving force is effective as an index for defining start timing of the internal combustion engine in the EV running period.

The operation and other advantages of the present invention will become more apparent from an embodiment explained below.

DESCRIPTION OF EMBODIMENT

Embodiment of the Invention

Hereinafter, with reference to the drawings, an embodiment of the present invention will be explained.

Configuration of Embodiment

Figure 1:
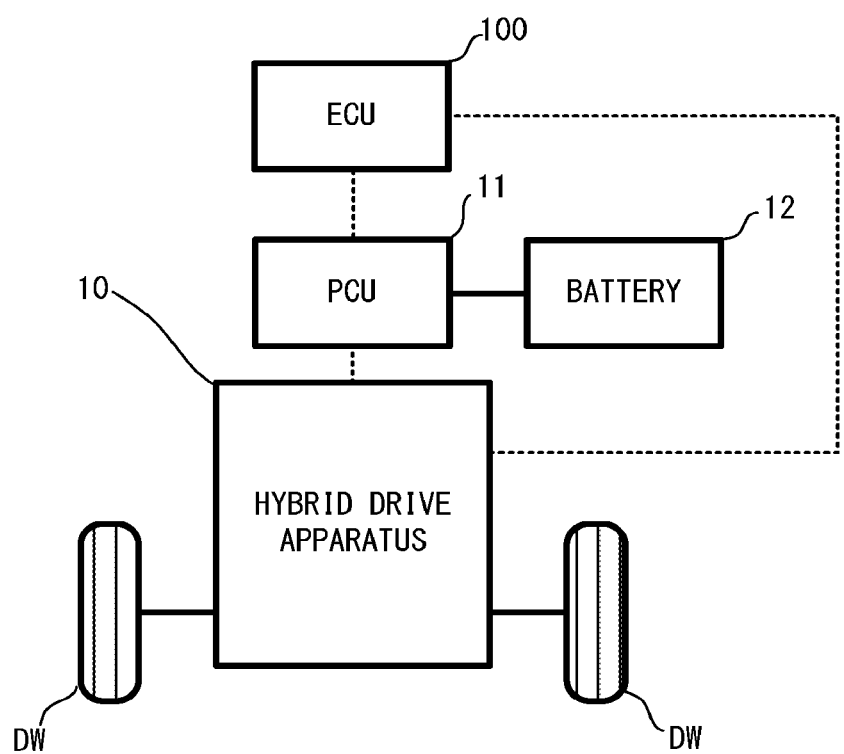
FIG. 1 is a schematic block diagram conceptually illustrating a configuration of a hybrid vehicle according to an embodiment of the present invention.

Firstly, with reference to FIG. 1, a configuration of a hybrid vehicle 1 according to an embodiment of the present invention will be explained. FIG. 1 is a schematic block diagram conceptually illustrating the configuration of the hybrid vehicle 1.

In FIG. 1, the hybrid vehicle 1 is a vehicle, which is provided with an electronic control unit (ECU) 100, a power control unit (PCU) 11, a battery 12, and a hybrid drive apparatus 10.

The ECU 100 is an electronic control unit, which is provided with a central processing unit (CPU), a read only memory (ROM), a random access memory (RAM), and the like, and which is configured to control the operation of each of the units of the hybrid vehicle 1. The ECU 100 is one example of the "control apparatus for the internal combustion engine" according to the present invention. The ECU 100 can perform EV running engine start control described later, in accordance with a control program stored in the ROM.

The PCU 11 is a known power control unit configured to control input/output of electric power between the battery 12 and each motor generator described later. The PCU 11 includes: a system main relay (SMR) configured to block or cut off electrical connection between the battery 12 and an electric power load; a boost converter configured to boost output voltage of the battery 12 up to boost command voltage suitable for the driving of each motor generator; an inverter configured to convert direct current (DC) power extracted from the battery 12 to alternating current (AC) power and supply it to a motor generator MG1 and a motor generator MG2 described later and configured to convert AC power generated by the motor generator MG1 and the motor generator MG2 to DC power and supply it to the battery 12; and the like (all of which are not illustrated). The PCU 11 is electrically connected to the ECU 100, and the operation thereof is controlled by the ECU 100.

The battery 12 is a chargeable secondary battery unit, which functions as an electric power supply associated with electric power for power running of the motor generator MG1 and the motor generator MG2. The battery 12 is configured in such a manner that a plurality of (e.g. several hundred) unit battery cells, such as, for example, lithium ion battery cells, are connected in series.

Although illustration is omitted, the hybrid vehicle 1 is provided with various sensors configured to detect various state quantities of the hybrid vehicle 1. For example, the various sensors include a vehicle speed sensor configured to detect a vehicle speed V of the hybrid vehicle 1, an accelerator opening sensor configured to detect an accelerator opening degree Ta, which is an operation amount of an accelerator pedal, a SOC sensor configured to detect a SOC of the battery 12, or the like. Each of the sensors is electrically connected to the ECU 100, and the detected various state quantities, control amounts, or physical quantities are referred to by the ECU 100, as occasion demands.

Figure 2:
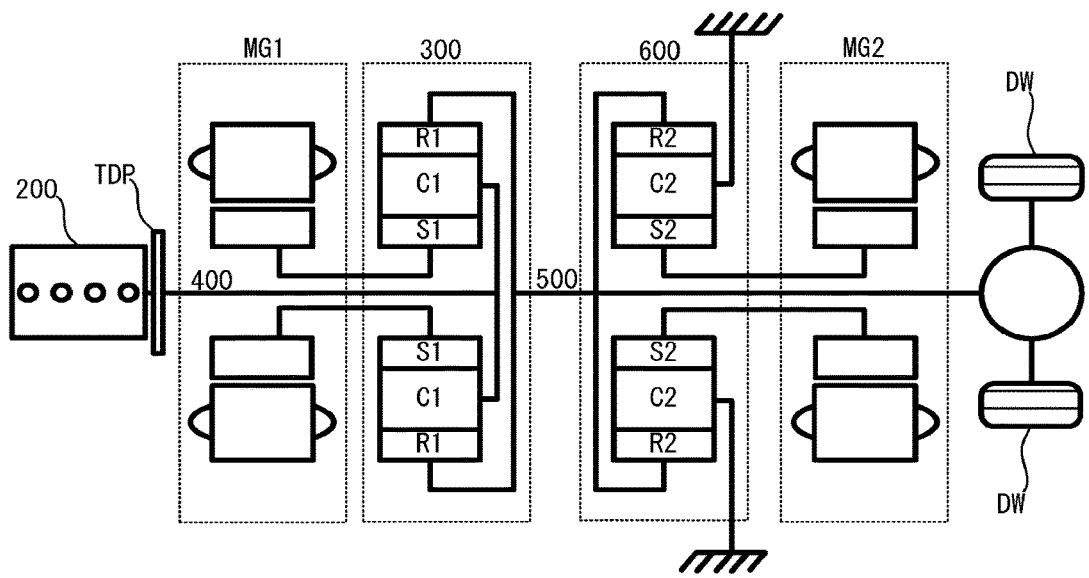
FIG. 2 is a schematic block diagram conceptually illustrating a configuration of a hybrid drive apparatus in the hybrid vehicle illustrated in FIG. 1.

The hybrid drive apparatus 10 is a power train of the hybrid vehicle 1. Now, with reference to FIG. 2, a detailed configuration of the hybrid drive apparatus 10 will be explained. FIG. 2 is a schematic block diagram conceptually illustrating the configuration of the hybrid drive apparatus 10. In FIG. 2, the same parts as those in FIG. 1 will carry the same reference numerals, and an explanation thereof will be omitted, as occasion demands.

The hybrid drive apparatus 10 is provided with an engine 200, a power dividing mechanism 300, an input shaft 400, a drive shaft 500, a speed reduction mechanism 600, the motor generator MG1 (hereinafter referred to as "MG1" as occasion demands), and the motor generator MG2 (hereinafter referred to as "MG2" as occasion demands).

The engine 200 is a gasoline engine, which functions as a main power source of the hybrid vehicle 1 and which is one example of the "internal combustion engine" according to the present invention.

Figure 3:
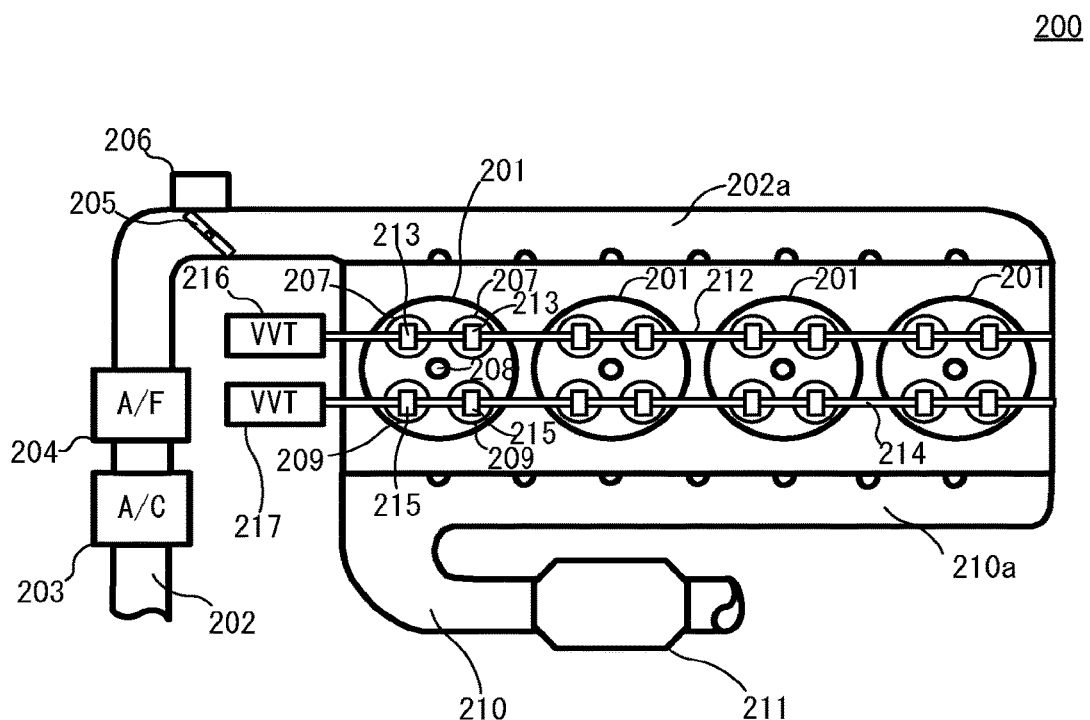
FIG. 3 is a schematic block diagram conceptually illustrating a configuration of an engine in the hybrid drive apparatus illustrated in FIG. 2.

Now, with reference to FIG. 3, a detailed configuration of the engine 200 will be explained. FIG. 3 is a schematic block diagram conceptually illustrating the configuration of the engine 200.

In FIG. 3, the engine 200 is an in-line four cylinder engine in which four cylinders 201 are arranged in series in a cylinder block (whose reference numeral is omitted), which uses gasoline as fuel and which is one example of the "internal combustion engine" according to the present invention. The engine 200 is configured to convert reciprocating motion of a not-illustrated piston, which occurs when an air-fuel mixture is burned inside each of the cylinders, to rotational motion via a connecting rod and a crankshaft (both of which are not illustrated). A rotational position of the crankshaft is detected by a not-illustrated crank position sensor, which is electrically connected to the ECU 100, and is referred to by the ECU 100 via a predetermined control bus.

In operation of the engine 200, the air sucked from the exterior is led to an intake passage 202, is purified by an air cleaner 203, and is then supplied to an intake manifold 202a, which communicates with each of the cylinders. An intake air amount associated with the sucked air is detected by an airflow meter 204 located on a downstream of the air cleaner 203. The airflow meter 204 is electrically connected to the ECU 100, and the intake air amount detected by the airflow meter 204 is referred to by the ECU 100, as occasion demands.

In the intake passage 202, a throttle valve 205 is provided. The intake air amount supplied to the intake manifold 202a is controlled according to an opening degree of the throttle valve 205. The throttle valve 205 is an electronically controlled intake throttle valve, which is driven by an electrically-driven throttle valve actuator including a DC motor. The throttle valve actuator is electrically connected to the ECU 100. The throttle valve 205 is configured in such a manner that the opening degree thereof is controlled by the ECU 100, for example, according to an opening degree of a not-illustrated accelerator pedal, or independently of the opening degree of the accelerator pedal.

Moreover, a throttle opening degree, which is the opening degree of the throttle valve 205, is detected by a throttle opening sensor 206, which is placed near the throttle valve 205. The throttle opening sensor 206 is electrically connected to the ECU 100, and the detected throttle opening degree is referred to by the ECU 100, as occasion demands.

In a combustion chamber in each of the cylinders 201, the air-fuel mixture is sucked via two intake valves 207, wherein the air-fuel mixture is obtained from the air supplied via the intake manifold 202a and the fuel injected, for example, from an electronically-controlled injector (not illustrated) in a not-illustrated intake port, which communicates with the intake manifold 202a. The air-fuel mixture is sucked into the combustion chamber at the time of valve opening of the intake valves 207. A fuel supply system, such as the injector, is electrically connected to the ECU 100, and an injection amount and injection timing (or an injection crank angle) thereof are controlled by the ECU 100.

Inside the combustion engine, the air-fuel mixture is burned by an ignition operation by a spark plug 208 in a combustion stroke. The spark plug 208 is electrically connected to the ECU 100, and ignition timing (or an ignition crank angle) thereof is controlled by the ECU 100.

The air-fuel mixture that has been burned in the combustion chamber is emitted to a not-illustrated exhaust port at the time of valve opening of two exhaust valves 209, which communicate with the exhaust port, and is further emitted via an exhaust manifold 210a, which communicates with the exhaust port, and an exhaust passage 210.

In the exhaust passage 210, a three-way catalyst 211 is provided. The exhaust gas emitted to the exhaust passage 210 is purified by the three-way catalyst 211, and is further purified by other catalyst apparatuses, which are placed at a later stage, in order, and is then emitted outside the vehicle.

An opening/closing operation of each of the intake valves 207 is controlled by an intake cam 213 fixed to an intake-side cam shaft 212, which is rotatably supported on a not-illustrated cylinder head, correspondingly to the each intake valve 207 and by a not-illustrated rocker arm configured to be rocked by the intake cam 213

On one end of the intake-side cam shaft 212, a VVT controller 216 for variably controlling valve timing of the intake valves 207 is provided. The VVT controller 216 is provided with a rotor and a housing fixed to a sprocket (not illustrated), which is turnably supported on an outer circumference of the intake-side cam shaft 212 extending perpendicular to the paper, by being fastened by a bolt or the like. The rotation of the crankshaft is transmitted to the sprocket and the housing via a timing chain (not illustrated). Thus, the sprocket and the housing rotate in synchronization with the crankshaft.

The intake-side cam shaft 212 is rotatably supported by a bearing cap and the cylinder head of the engine 200. The rotor is fixed by being fastened by the bolt via a stopper on one end of the intake-side cam shaft 212 supported in the above manner, and is turnably accommodated in the housing. Inside the housing, a plurality of liquid chambers are formed, and each of the liquid chambers is divided into an advance chamber and a retard chamber by a vane formed in an outer circumferential portion of the rotor. In an outer circumferential portion of the intake-side cam shaft 212, a retard side passage portion is formed in an annular manner, and communicates with each of the retard chambers via a not-illustrated hydraulic passage. Moreover, in the outer circumferential portion of the intake-side cam shaft 212, an advance side passage portion is formed in an annular manner, as in the retard side passage portion, and communicates with each of the advance chambers via a not-illustrated hydraulic passage.

Under such a configuration, the VVT controller 216 supplies operating oil to the advance chambers or the retard chambers via a hydraulic transmission system including the retard side passage portion and the advance side passage portion, as occasion demands, and rotates the vane relatively to the housing, thereby variably controlling the valve timing of the intake valves 207.

On the other hand, an opening/closing operation of each of the exhaust valves 209 is controlled by an exhaust cam 215 fixed to an exhaust-side cam shaft 214, which is rotatably supported on the not-illustrated cylinder head, correspondingly to the each exhaust valve 209 and by a not-illustrated rocker arm configured to be rocked by the exhaust cam 215.

On one end of the exhaust-side cam shaft 214, a VVT controller 217 for variably controlling valve timing of the exhaust valves 209 is provided. The VVT controller 217 is provided with a rotor and a housing fixed to a sprocket (not illustrated), which is turnably supported on an outer circumference of the exhaust-side cam shaft 214 extending perpendicular to the paper, by being fastened by a bolt or the like. The rotation of the crankshaft is transmitted to the sprocket and the housing via a timing chain (not illustrated). Thus, the sprocket and the housing rotate in synchronization with the crankshaft.

The exhaust-side cam shaft 214 is rotatably supported by a bearing cap and the cylinder head of the engine 200. The rotor is fixed by being fastened by the bolt via a stopper on one end of the exhaust-side cam shaft 214 supported in the above manner, and is turnably accommodated in the housing. Inside the housing, a plurality of liquid chambers are formed, and each of the liquid chambers is divided into an advance chamber and a retard chamber by a vane formed in an outer circumferential portion of the rotor. In an outer circumferential portion of the exhaust-side cam shaft 214, a retard side passage portion is formed in an annular manner, and communicates with each of the retard chambers via a not-illustrated hydraulic passage. Moreover, in the outer circumferential portion of the exhaust-side cam shaft 214, an advance side passage portion is formed in an annular manner, as in the retard side passage portion, and communicates with each of the advance chambers via a not-illustrated hydraulic passage.

Under such a configuration, the VVT controller 217 supplies operating oil to the advance chambers or the retard chambers via a hydraulic transmission system including the retard side passage portion and the advance side passage portion, as occasion demands, and rotates the vane relatively to the housing, thereby variably controlling the valve timing of the exhaust valves 209.

Figure 4:
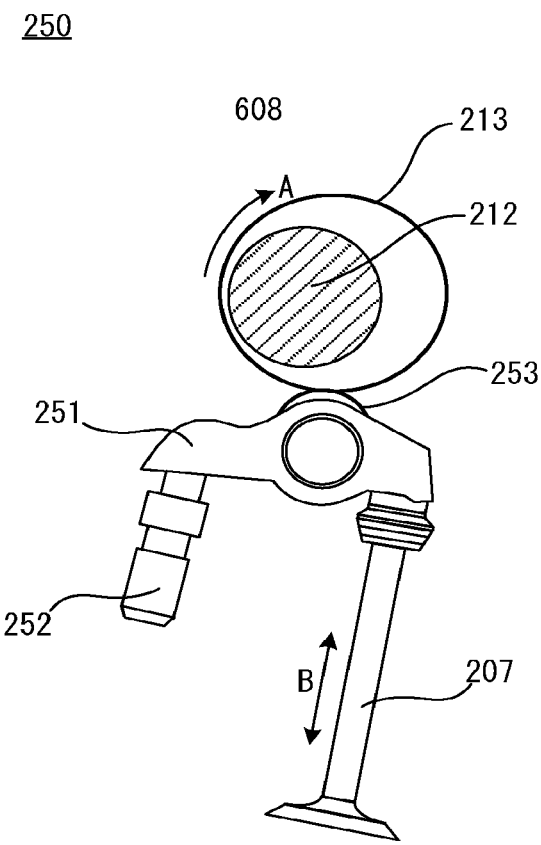
FIG. 4 is a schematic cross-sectional side view illustrating an intake valve drive mechanism.

Now, with reference to FIG. 4, an intake valve drive mechanism 250 (not illustrated in FIG. 3) configured to drive the opening/closing of the intake valve 207 will be explained. FIG. 4 is a schematic cross-sectional side view conceptually illustrating a configuration of the intake valve drive mechanism. 250. In FIG. 4, the same parts as those in FIG. 3 will carry the same reference numerals, and an explanation thereof will be omitted, as occasion demands.

Figure 5:
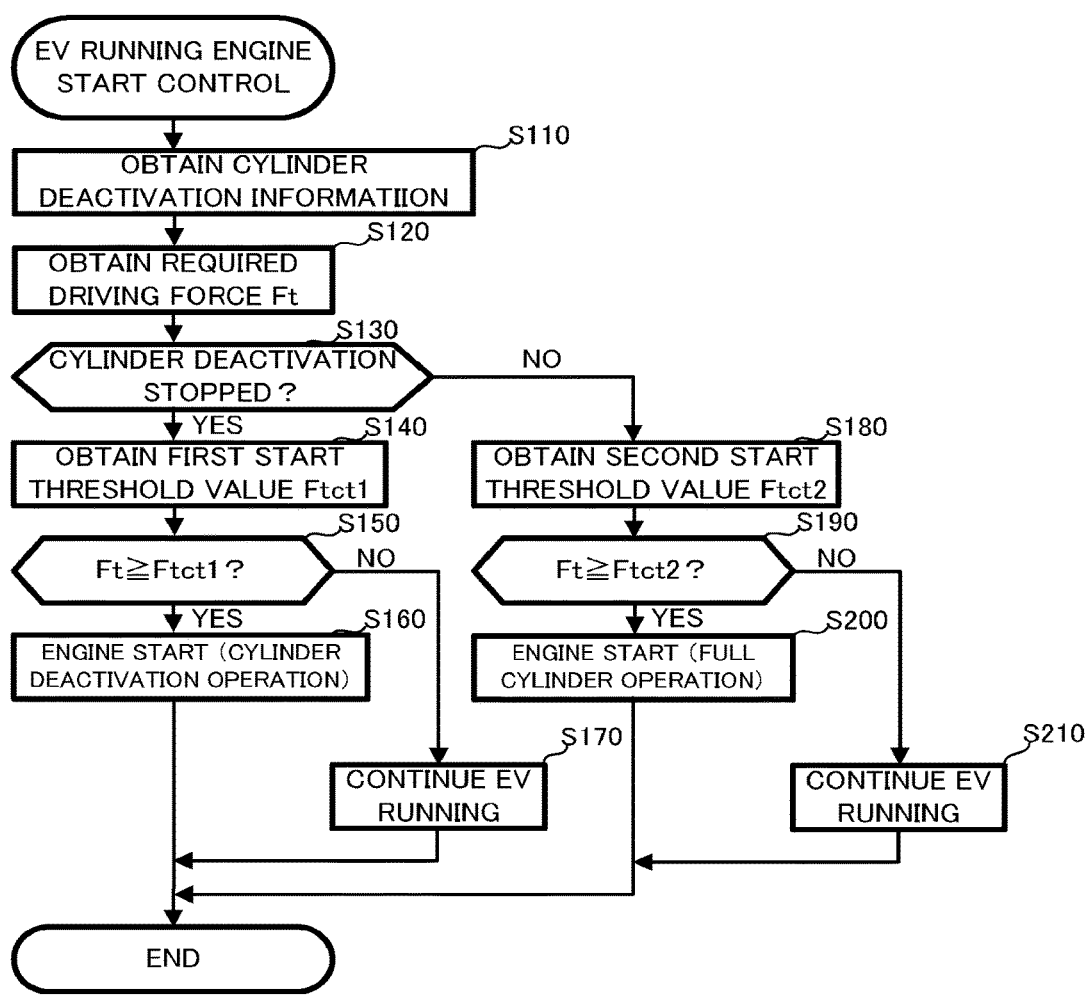
FIG. 5 is a flowchart illustrating EV running engine start control.

In FIG. 5, the intake valve drive mechanism 250 is a mechanism configured to convert rotational motion of the intake cam 213 fixed to the intake cam shaft 212 (refer to an arrow A illustrated) to linear motion of the intake valve 207 (refer to an arrow B illustrated), i.e. to a valve opening/closing motion.

The intake valve drive mechanism 250 is provided with: a rocker arm 251 supported at one end by a hydraulic lash adjuster 252, the rocker arm rocking with the intake valve 207; and a rocker roller 253 placed between the rocker arm 251 and the intake cam 213.

The rocker roller 253 is normally fixed in such a manner that the rocker roller 253 cannot relatively move to the rocker arm 251. In this state, if the rocker roller 253 is pressed against the intake cam 213 and turns in an opening/closing direction of the intake valve 207 according to a cam profile, the rocker arm 251 also turns in the same manner. As a result, a valve lift operation of the intake valve 207 is realized.

On the other hand, the intake valve drive mechanism 250 is provided with a valve lift stop apparatus (not illustrated) configured to switch a state of the rocker roller 253 between a relatively immovable state and a relatively movable state with respect to the rocker arm 251.

The valve lift stop apparatus is an apparatus configured to fix the rocker arm 251 and the rocker roller 253, for example, by allowing a stopper, which is driven according to hydraulic pressure supplied in the same hydraulic supply system as that of the VVT controller, to act on the rocker roller 253 or the rocker arm 251 from the side of the rocker roller 253 or the rocker arm 251.

Due to the valve lift stop apparatus, in a state in which the rocker roller 253 can move relatively to the rocker arm 251, even if the rocker roller 253 is pressed by the intake cam 213, the rocker roller 253 only relatively moves to the rocker arm 251 and does not drive the rocker arm 251. In other words, the rocker arm 251 is immovable with respect to the rotational operation of the intake cam 207. As a result, the valve lift of the intake valve 207 is stopped.

In a cylinder deactivation operation of the engine 200 described later, the intake valve 207 corresponding to a resting cylinder is maintained in the valve lift stop state due to the action of the valve lift stop apparatus. Therefore, a new air is not supplied to an intake cylinder, and the resting cylinder becomes in a rest state.

In the engine 200, a drive mechanism for the exhaust valve 209 is also configured in the same manner as in the intake valve drive mechanism 250. There is also provided a valve lift stop apparatus configured to stop the valve lift of the exhaust valve 209, in the same manner. In the cylinder deactivation operation of the engine 200 described later, the exhaust valve 209 corresponding to a resting cylinder is maintained in the valve lift stop state due to the action of the valve lift stop apparatus, as in the intake valve 207.

In order to ensure the exhaust gas purification performance of the three-way catalyst 211, it is not preferable that the exhaust gas is oxygen-rich. The valve lift stop apparatuses fix the intake valve 207 and the exhaust valve 209 at fully closed positions so that the new air is not emitted to the exhaust passage. But, the purpose of preventing the emission of the new air can be also realized only by fixing the intake valve 207 or the exhaust valve 209 at the fully closed position.

The aspect of the valve lift stop apparatus and the valve drive mechanism explained here is merely one example. The valve lift stop apparatus and the valve drive mechanism can adopt various known aspects as long as they can realize the cylinder deactivation operation in which a part of the cylinders is set in the rest state. Alternatively, a configuration for realizing the cylinder deactivation operation can adopt various known aspects.

Back in FIG. 2, the motor generator MG1 is an electric motor generator, which has a power running function for converting electrical energy to kinetic energy and a regeneration function for converting kinetic energy to electrical energy, and which is one example of the "rotary electric machine" according to the present invention.

The motor generator MG2 is an electric motor generator having a larger body than that of the motor generator MG1. The motor generator MG2 has, as in the motor generator MG1, a power running function for converting electrical energy to kinetic energy and a regeneration function for converting kinetic energy to electrical energy, and is another example of the "rotary electric machine" according to the present invention. In other words, the hybrid drive apparatus 10 according to the embodiment is configured as a so-called two motor type hybrid drive apparatus. The hybrid vehicle according to the present invention may be provided with a so-called one motor type hybrid drive apparatus having a single motor generator.

Each of the motor generators MG1 and MG2 is configured as a synchronous motor generator, and is provided with, for example, a rotor(s) having a plurality of permanent magnets on an outer circumferential surface, and a stator around which a three-phase coil for forming a rotating magnetic field is wound. Of course, the motor generators MG1 and MG2 may have another configuration.

The power dividing mechanism 300 is a known planetary gear mechanism provided with a plurality of rotating elements that perform a differential action on each other.

The power dividing mechanism 300 is provided with: a sun gear S1 placed in a central portion; a ring gear R1 coaxially placed on an outer circumference of the sun gear S1; a plurality of pinion gears (not illustrated) placed between the sun gear S1 and the ring gear R1, the pinion gears revolving while rotating on an outer circumference of the sun gear S1; and a carrier C1 pivotally supporting respective rotating shafts of the pinion gears.

The sun gear S1 is a reaction element for bearing reaction torque with respect to engine torque Te, which is output torque of the engine 200, and is fixed to a rotor of the motor generator MG1. Therefore, a rotational speed of the sun gear S1 is equal to a MG1 rotational speed Nmg1, which is a rotational speed of the motor generator MG1.

The ring gear R1 is an output element of the power dividing mechanism 300, and is coupled with the drive shaft 500, which is a power output shaft of the power dividing mechanism 300, in a manner of sharing its rotating shaft. The drive shaft 500 is indirectly coupled with drive wheels DW of the hybrid vehicle 1 via a differential or the like.

The carrier C1 is coupled with the input shaft 400, which is coupled with a crankshaft of the engine 200 via a torsion damper TDP, in a manner of sharing its rotating shaft. A rotational speed of the carrier C1 is equal to the number of engine revolutions NE of the engine 200.

Under the aforementioned configuration, the power dividing mechanism 300 can distribute the engine torque Te, which is supplied to the input shaft 400 from the engine 200, to the sun gear S1 and the ring gear R1 by the carrier C1 at a predetermined ratio (or a ratio according to a gear ratio between the gears), and can divide power of the engine 200 into two systems.

At this time, in order to make it easy to understand the operation of the power dividing mechanism 300, a gear ratio ρ is defined as the number of teeth of the sun gear S1 to the number of teeth of the ring gear R1. In this case, if the engine torque Te is applied to the carrier C1 from the engine 200, partial torque Tes, which acts on the sun gear S1, is expressed by the following equation (1), and direct torque or directly transmitted torque Ter, which appears on the drive shaft 500, is expressed by the following equation (2).

$$Tes = Te \times \rho/(1+\rho) \qquad (1)$$

$$Ter = Te \times 1/(1+\rho) \qquad (2)$$

As explained above, the rotor of the motor generator MG1 is fixed to the sun gear S1. In the hybrid vehicle 1, power generation using the engine power can be performed by allowing torque (or regenerative torque) having the same magnitude of the partial torque Tes to act from the motor generator MG1. In other words, in the hybrid drive apparatus 10, the direct torque Ter is allowed to act on the drive shaft 500 by supplying the reaction torque from the motor generator MG1.

The speed reduction mechanism 600 is a planetary gear mechanism placed between the drive shaft 500 connected to an axle and the motor generator MG2, and is provided with rotating elements, such as a sung gear S2, a ring gear R2, pinion gears (not illustrated), and a carrier C2.

In the speed reduction mechanism 600, the sun gear S2 is fixed to a rotor of the motor generator MG2. The carrier C2 is non-rotatably fixed to an outer case of the hybrid drive apparatus 10. The ring gear R2 is coupled with the drive shaft 500. In such a configuration, the speed reduction mechanism 600 can reduce and transmit a rotational speed Nmg2, which is a rotational speed of the motor generator MG2, to the drive shaft 500, in accordance with a speed reduction ratio determined according to the gear ratio of the rotating elements (or gears).

The configuration of the speed reduction mechanism 600 is merely one form that can be adopted by a mechanism configured to reduce the rotation of the motor generator MG2, and this type of speed reduction mechanism can have various forms in practice. Moreover, this type of speed reduction mechanism is not necessarily provided for the hybrid drive apparatus. In other words, the motor generator MG2 may be directly connected to the drive shaft 500.

Operation of Embodiment

Next, the operation of the embodiment will be explained.
<Running Mode of Hybrid Vehicle 1>
The hybrid vehicle 1 has a HV running mode and an EV running mode, as a running mode for defining a power transmission aspect between the hybrid vehicle 10 and the drive wheels DW.

The HV running mode is a running mode of allowing the direct torque Ter, which is a part of the engine torque Te, and MG2 torque Tmg2, which is output torque of the motor generator MG2, to cooperatively act on the drive shaft 500 by using a power dividing action of the power dividing mechanism 300. Moreover, in the HV running mode, the partial torque Tes is used to perform electric power regeneration, i.e. power generation, by MG1 torque Tmg1, which is output torque of the motor generator MG1 (i.e. or reaction torque of the partial torque Tes).

At this time, an operating point of the engine 200 (or an operating condition defined by the number of engine revolutions NE and the engine torque Te) can be arbitrarily set by an electric continuously variable transmission (CVT) function of the hybrid drive apparatus 10 using the MG1 torque Tmg1 as the reaction torque. The operating point of the engine 200 is basically controlled at an optimum fuel efficiency operating point at which a fuel consumption rate (or fuel efficiency) of the engine 200 is minimum, as a preferable form.

In contrast, the MG2 torque Tmg2 is controlled basically to compensate for an insufficiency of the direct torque Ter for drive shaft required torque, which is required for the drive shaft 500. In other words, in the HV running mode, cooperative control of the MG2 torque Tmg2 and the engine torque Te is performed.

For example, in the cooperative control, a power generation amount of the motor generator MG1 and a discharge amount of the motor generator MG2 or a discharge amount of an auxiliary apparatus are always adjusted so that the SOC of the battery 12 is maintained at a target SOC, which is a target value. For example, if the SOC of the battery 12 is greater than the target SOC, a ratio of the MG2 torque Tmg2 to the drive shaft required torque is increased, or similar actions are performed, by which power balance is inclined to a discharge side. On the other hand, if the SOC of the battery 12 is lower than the target SOC, the ratio is reduced or similar actions are performed, by which the power balance is inclined to a charge side.

On the other hand, the EV running mode is a running mode of allowing only the MG2 torque Tmg2 to act on the drive shaft 500 and driving the hybrid vehicle 1 only by power of the motor generator MG2. In the EV running mode, the engine 200 is basically in a stop state. In some cases, however, the minimum engine operation for supplying electric power to the auxiliary apparatus is performed.

<Operation Aspect of Engine 200>

In the engine 200, due to the action of the valve lift stop apparatus in the drive mechanisms for the intake and exhaust valves described above, the intake and exhaust valves of a part of the cylinders are maintained at the fully closed positions to allow the cylinder to be in the rest state. Hereinafter, the operation aspect that allows a part of the cylinders to be rested is expressed as a "cylinder deactivation operation", as occasion demands. In contrast, the normal operation aspect that allows all the cylinders to be in an operating state is expressed as a "full cylinder operation", as occasion demands. The switching of the operation aspect between the cylinder deactivation operation and the full cylinder operation is performed by the ECU 100 configured to control the operation of the valve lift stop apparatus.

As described above, the engine 200 has the two types of operation aspects according to the rest state of the cylinders. Therefore, the aforementioned HV running mode also has two types of running modes, which are a cylinder deactivation HV running mode of setting the engine 200 in the cylinder deactivation operation and a full cylinder HV running mode of setting the engine 200 in the full cylinder operation.

The number of resting cylinders in the cylinder deactivation operation is not particularly limited. Moreover, if only a particular cylinder is set to be always a rest target, a physical state of the cylinder possibly varies, and thus, the cylinder that is the rest target may be changed at each time. Moreover, the engine 200 according to the embodiment is an in-line four cylinder engine; however, in the case of a V-type engine, one of banks may be rested.

By the way, between the cylinder deactivation operation and the full cylinder operation, the number of operating cylinders is different, which thus changes combustion noise of the entire engine. Therefore, if the operation aspect is frequently switched between the cylinder deactivation operation and the full cylinder operation, a driver possibly feels discomfort. Moreover, at the start of the internal combustion engine, there is such an option that this type of switching of the operation aspect is performed before the start. Even in this case, there are a start delay, a reduction in fuel efficiency, and the like. In order to prevent the frequent switching of the operation aspect as described above, the EV running engine start control is performed in the hybrid vehicle 1. The EV running engine start control is control performed during running by the EV running mode (or during EV running), and is control regarding the start of the engine 200.

<Details of EV Running Engine Start Control>

Firstly, with reference to FIG. 5, a flow of the EV running engine start control will be explained. FIG. 5 is a flowchart illustrating the EV running engine start control.

In FIG. 5, the ECU 100 obtains cylinder resting information of the engine 200 (step S110). The cylinder resting information is information regarding the aforementioned operation aspect of the engine 200 at a latest engine stop time point. In other words, the cylinder resting information is simply binary information regarding whether the engine 200 is previously stopped in the cylinder deactivation operation or in the full cylinder operation. The ECU 100 is configured to store therein the cylinder resting information, in transition to the EV running mode associated with the stop of the engine 200.

If the cylinder deactivation information is obtained, the ECU 100 obtains a required driving force Ft of the hybrid vehicle 1 (step S120). The required driving force Ft is a driving force required for the drive wheels DW. The required driving force Ft is obtained from a required driving force map stored in the ROM in advance. In the required driving force map, the required driving force Ft is set in advance by using the vehicle speed V and the accelerator opening degree Ta as parameters. The required driving force Ft is one example of the "required output corresponding value" according to the present invention.

If the required driving force Ft is calculated, the ECU 100 determines whether or not the engine 200 is stopped in the cylinder deactivation operation, on the basis of the cylinder resting information obtained in the step S110 (step S130). If the engine 200 is stopped in the cylinder deactivation operation (the step S130: YES), the ECU 100 obtains a first start threshold value Ftct1 (step S140).

If the first start threshold value Ftct1 is obtained, the ECU 100 determines whether or not the required driving force Ft is greater than or equal to the first start threshold value Ftct1 (step S150). If the required driving force Ft is less than the first start threshold value Ftct1 (the step S150: NO), the ECU 100 continues the EV running mode without starting the engine 200 (step S170). If the required driving force Ft is greater than or equal to the first start threshold value Ftct1 (the S150: YES), the ECU 100 starts the engine 200 (step S160), and switches the running mode to the HV running mode.

Here, in the step S160, since the engine 200 is stopped in the cylinder deactivation operation, the operation aspect at the start is also the cylinder deactivation operation. Necessarily, the running mode is the cylinder deactivation HV running mode.

Additionally, in order to switch the operation aspect, it is necessary to fix the rocker roller 253 and the rocker arm 251 by using the valve lift stop apparatus of a hydraulic drive type, or it is necessary to release the fixation, as described above. Therefore, if the operation aspect is to be switched before the engine start, a time required to drive the valve lift stop apparatus apparently becomes a start delay of the engine 200. In order to avoid an influence on the driving force by the start delay of the engine 200 as described above, it is assumed in the embodiment that the operation aspect is not switched before the engine start.

In the hybrid drive apparatus 10, a power transmission between the engine 200 and the drive shaft 500 is not blocked or cut off even during the EV running. Thus, the engine 200 is stopped with the number of revolutions of zero, or is in a so-called motoring state. In the motoring state, the rising of hydraulic pressure of a hydraulic drive apparatus, which is configured to supply hydraulic pressure to this switching apparatus, is not significantly delayed. In other words, an apparatus for maintaining the hydraulic pressure (e.g. an electric pump and an electric drive apparatus), which causes an increase in cost, is not necessarily required. On the other hand, the switching of the operation aspect of this type is performed after it is required to start the engine. Therefore, even if the rising of the hydraulic pressure has not significant delay, the start of the engine 200 is definitely or certainly delayed, by a time required for the operation of the valve lift stop apparatus associated with prohibition of the valve lift operation or release from the prohibition.

Moreover, the switching of the operation aspect before the engine start may be performed, even though it is assumed not to be performed in the embodiment. In this case, there is no discomfort caused by the combustion noise, but there are the driving force insufficiency, the reduction in fuel efficiency, or the increase in cost caused by the start delay. In other words, as long as the frequency of switching the operation aspect is not suppressed, there are some problems to be improved.

If the EV running mode is continued, or if the running mode of the hybrid vehicle 1 is moved to the cylinder deactivation HV running mode, the EV running engine start control is ended. If the EV running mode is continued, the process is returned to the step S110 again with a predetermined period after the end of the EV running engine start control. In other words, the EV running engine start control is repeatedly performed. If the step S160 is performed, the running mode of the hybrid vehicle 1 is moved to the cylinder deactivation HV running mode, and thus, the EV running engine start control is not performed until the next EV running.

On the other hand, in the step S130, if the engine 200 is stopped in the full cylinder operation (the step S130: NO), the ECU 100 obtains a second start threshold value Ftct2 (step S180).

If the second start threshold value Ftct2 is obtained, the ECU 100 determines whether or not the required driving force Ft is greater than or equal to the second start threshold value Ftct2 (step S190). If the required driving force Ft is less than the second start threshold value Ftct2 (the step S190: NO), the ECU 100 continues the EV running mode without starting the engine 200 (step S210). If the required driving force Ft is greater than or equal to the second start threshold value Ftct2 (the step S190: YES), the ECU 100 starts the engine 200 and switches the running mode to the HV running mode (step S200). In the step S200, the engine 200 is stopped in the full cylinder operation, and thus, the operation aspect at the start is also the full cylinder operation. In other words, the running mode of the hybrid vehicle 1 is the full cylinder HV running mode.

If the EV running mode is continued, or if the running mode of the hybrid vehicle 1 is moved to the full cylinder HV running mode, the EV running engine start control is ended. If the EV running mode is continued, the process is returned to the step S110 again with a predetermined period after the end of the EV running engine start control. In other words, the EV running engine start control is repeatedly performed. If the step S200 is performed, the running mode of the hybrid vehicle 1 is moved to the full cylinder HV running mode, and thus, the EV running engine start control is not performed until the next EV running.

The EV running engine start control is performed in the above manner.

Figure 6:
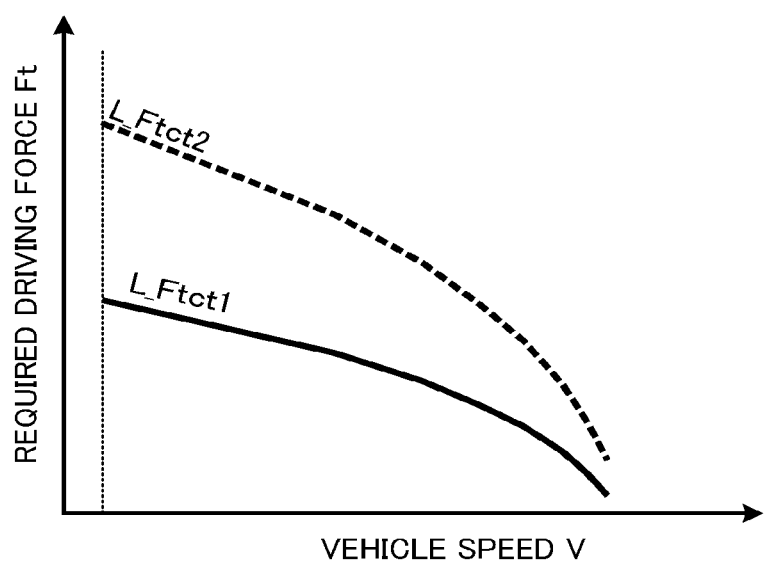
FIG. 6 is a conceptual diagram illustrating an engine start threshold map.

Here, the first start threshold value Ftct1 and the second start threshold value Ftct2 described above in the EV running engine start control are obtained from a start threshold map stored in the ROM in advance. Now, with reference to FIG. 6, the start threshold map will be explained. FIG. 6 is a conceptual diagram illustrating the start threshold map.

In FIG. 6, the required driving force Ft is illustrated on a vertical axis, and the vehicle speed V is illustrated on a horizontal axis. On this coordinate plane, the first start threshold value Ftct1 is expressed as L_Ftct1 illustrated (refer to a solid line). The second start threshold value Ftct2 is expressed as L_Ftct2 illustrated (refer to a dashed line). In other words, the second start threshold value Ftct2, which allows the engine 200 to be started in the full cylinder operation, is always set on a higher driving force side than the first start threshold value Ftct1.

Particularly here, on the hybrid drive apparatus 10, if the vehicle speed V is determined, a rotational speed of the drive shaft 500 is determined. The required driving force Ft can be converted to the drive shaft required torque, which is required for the drive shaft 500, by physical conversion based on a tire diameter, a gear ratio of the differential, or the like. In other words, the coordinate plane in FIG. 6 can be treated as a plane that have the rotational speed of the drive shaft 500 and the drive shaft required torque as axis elements. Therefore, a coordinate point of the coordinate plane in FIG. 6 corresponds to required output Pn of the hybrid vehicle 1.

It can be thus also said that the second start threshold value Ftct2 is set on a higher output side than the first start threshold value Ftct1 in FIG. 6. In other words, the first start threshold value Ftct1 is one example of the "first reference value" according to the present invention, and the second start threshold value Ftct2 is one example of the "second reference value" according to the present invention. In the start threshold map, a relation corresponding to FIG. 6 is digitized and stored, and the ECU 100 can obtain a required driving force value according to the vehicle speed V at that time point as the start threshold value.

The required output Pn of the hybrid vehicle 1 is the drive shaft required output, which is required for the drive shaft 500, and is not necessarily equal to engine required output Pen, which is required for the engine 200. As described above, the engine torque Te is divided to the direct torque Ter and the partial torque Tes. If the drive shaft required torque and the direct torque Ter are set equal to each other, the engine required output Pen necessarily increases by the amount of the partial torque Tes corresponding to a power generation load. On the other hand, the engine required output Pen can be also set equal to the required output Pn of the hybrid vehicle 1. In this case, the direct torque Ter is insufficient for the drive shaft required torque by the amount of the partial torque Tes corresponding to the power generation load. In this case, torque assist is performed by the MG2 torque Tmg2, which is supplied from the motor generator MG2.

In the embodiment, the first start threshold value Ftct1 is set as a value that allows efficiency of the hybrid vehicle 1 during running in the cylinder deactivation HV running mode (or during the cylinder deactivation HV running) to be higher than efficiency of the hybrid vehicle 1 during the EV running in an area that is greater than or equal to the first start threshold value Ftct1.

Here, there is no fuel consumption of the engine 200 during the EV running; however, electric power consumed during the EV running is compensated for by the power generation by the motor generator MG1 described above in the HV running mode, for a medium to long term perspective.

Therefore, if a fuel amount required to perform the power generation corresponding to a discharge amount of the battery 12 when the required driving force Ft is supplied from the motor generator MG2 is greater than a fuel amount when the cylinder deactivation HV running mode is selected, it is then better to select the cylinder deactivation HV running mode in terms of fuel efficiency. The first start threshold value Ftct1 is determined, from this viewpoint, experimentally, experientially, or theoretically in advance. In the same manner, in the embodiment, the second start threshold value Ftct2 is set as a value that allows efficiency of the hybrid vehicle 1 during running in the full cylinder HV running mode (or during the full cylinder HV running) to be higher than the efficiency of the hybrid vehicle 1 during the EV running in an area that is greater than or equal to the second start threshold value Ftct2.

The embodiment is configured in such a manner that each of the first and second start threshold values is stored in the map; however, the embodiment can adopt an aspect other than that.

For example, the efficiency during the EV running can be calculated at each time from electric power consumption, the SOC of the battery 12, charge/discharge efficiency of the battery 12, power generation efficiency of the motor generator MG1, thermal efficiency of the engine 200, or the like. Moreover, in a running condition in which regular power regeneration by the motor generator MG2 is predicted to be performed, a prediction value of a power regeneration amount (or a charge amount) or the like may be considered. If the efficiency during the EV running is calculated, it is possible to calculate a required output value that allows the efficiency during the cylinder deactivation HV running or the full cylinder HV running to be greater than the value of the efficiency during the EV running.

Next, a state of the hybrid vehicle 1 in an implementation period of the EV running engine start control will be explained.

Figure 7:
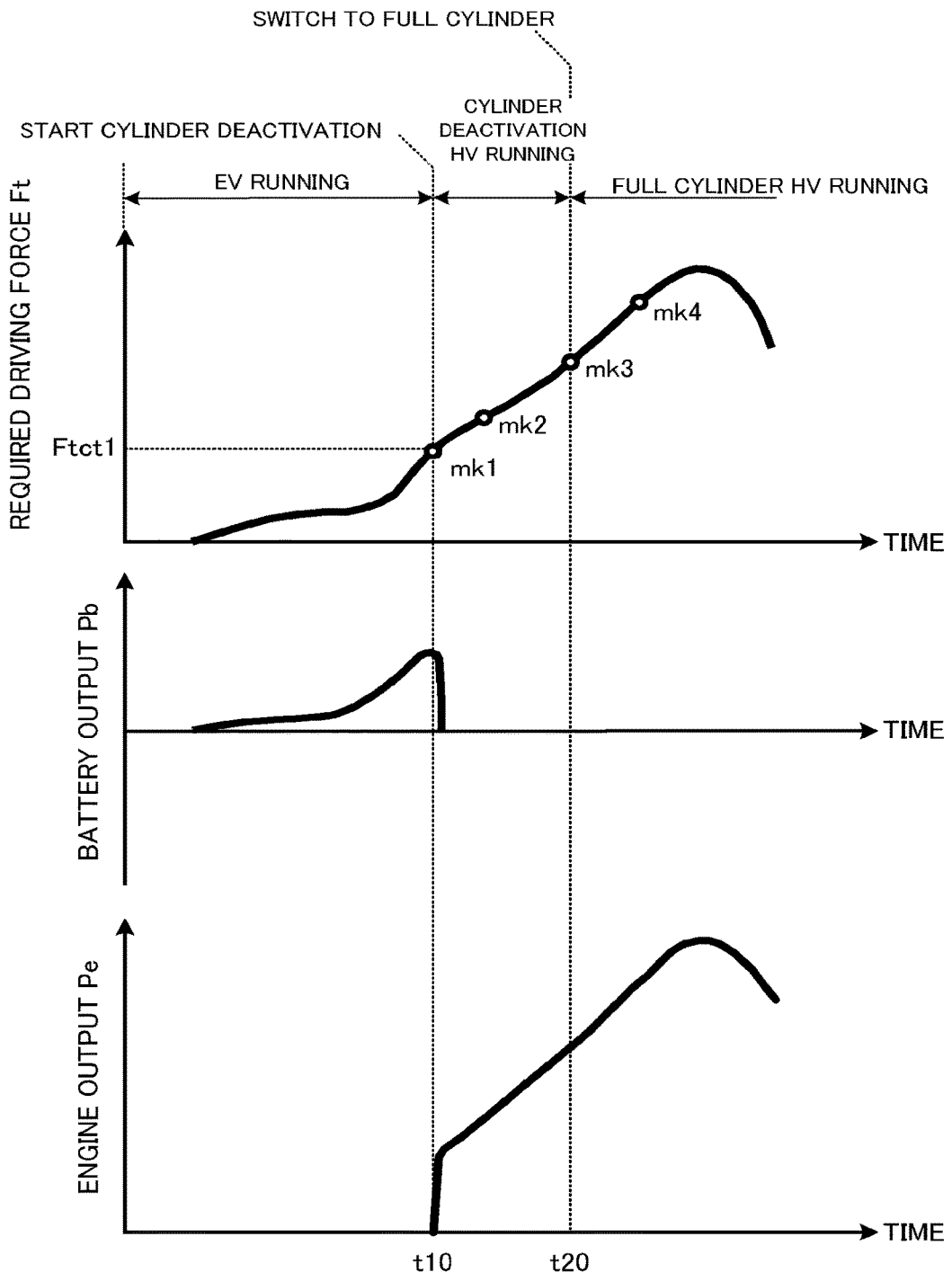
FIG. 7 is a timing chart regarding engine start timing at the stop of cylinder deactivation.

Firstly, with reference to FIG. 7, a state at the stop of cylinder deactivation will be explained. FIG. 7 is a timing chart regarding engine start timing at the stop of the cylinder deactivation.

FIG. 7 exemplifies respective time transitions of the required driving force Ft, battery output Pb, and engine output Pe, in the implementation period of the EV running engine start control.

In FIG. 7, the EV running is performed before a time point t10, and the engine output Pe is zero. At the time point t10, if the required driving force Ft reaches the first start threshold value Ftct1, the engine 200 is started in the cylinder deactivation operation (refer to a marker mk1 illustrated).

Then, the cylinder deactivation HV running is continued (refer to a marker mk2 illustrated), and at a time point t20 at which a condition of switching to the full cylinder operation is satisfied, the switching is performed from the cylinder deactivation operation to the full cylinder operation (refer to a marker mk3 illustrated). After the switching to the full cylinder operation, the full cylinder HV running is continued (refer to a marker mk4 illustrated). The switching from the cylinder deactivation operation to the full cylinder operation is performed on the basis of the thermal efficiency of the engine 200. This will be described later.

Figure 8:
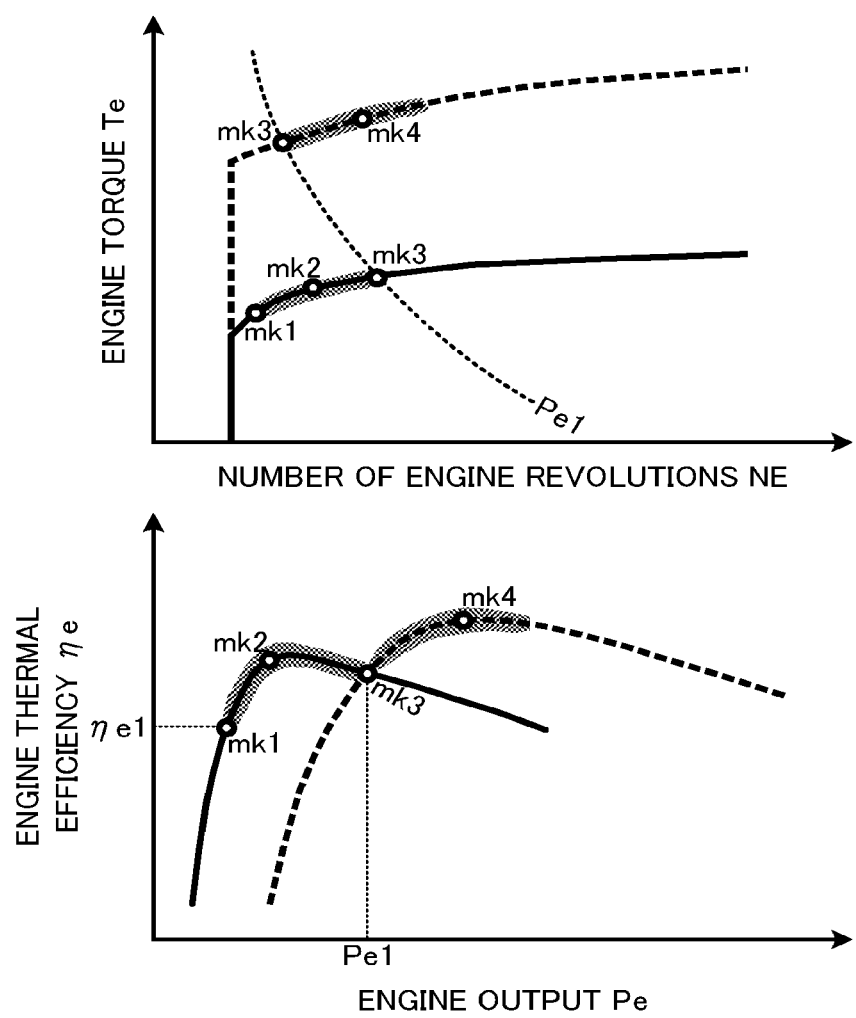
FIG. 8 is diagrams explaining a state of the engine corresponding to FIG. 7.

FIG. 8 is diagrams explaining the operating state of the engine corresponding to FIG. 7. In FIG. 8, the same parts as those in FIG. 7 will carry the same reference numerals, and an explanation thereof will be omitted, as occasion demands.

In FIG. 8, an upper part is a diagram explaining the operating point of the engine 200 defined by the number of engine revolutions NE and the engine torque Te, wherein a solid line indicates an optimum fuel efficiency operating line in the cylinder deactivation operation, and a dashed line indicates an optimum fuel efficiency operating line in the full cylinder operation. A lower part is a diagram exemplifying a relation between the engine output Pe and engine thermal efficiency ηe, wherein a solid line indicates a thermal efficiency characteristic line in the cylinder deactivation operation, and a dashed line indicates a thermal efficiency characteristic line in the full cylinder operation. Each diagram is accompanied by the same markers as those in FIG. 7, as occasion demands.

In FIG. 8, a transition of the operating point of the engine 200 is hatched on each of the optimum fuel efficiency operating line and the thermal efficiency characteristic line.

As illustrated, a peak value of the engine thermal efficiency ηe in the cylinder deactivation operation is on a lower output side than a peak value in the full cylinder operation. This is because the number of operating cylinders decreases in the cylinder deactivation operation, thereby increasing output per cylinder, if comparison is made by using the same output value. Since the output per cylinder increases, the degree of throttling the intake air by the throttle valve 205 is moderated or reduced. As a result, a pumping loss decreases, and the thermal efficiency increases.

On the other hand, in the cylinder deactivation operation, output limit decreases because the number of operating cylinders decreases. Necessarily, an output value at which the engine thermal efficiency ηe starts to be reduced is shifted to a much lower side. As a result, at a certain engine output, the engine thermal efficiency in the cylinder deactivation operation matches the engine thermal efficiency in the full cylinder operation. If the engine output Pe at this time is assumed to be Pe1, the cylinder deactivation operation is basically shifted to the full cylinder operation at a time point at which the engine output Pe reaches Pe1.

As described above, if the engine 200 is stopped in the cylinder deactivation operation, the engine 200 is started with the cylinder deactivation operation maintained at the time point at which the required driving force Ft reaches the first start threshold value Ftct1, which is on the lower output side than the second start threshold value Ftct2. There is thus no shift to the full cylinder operation before the start and immediately after the start. In other words, the frequency of switching the operation aspect can be reduced.

Figure 9:
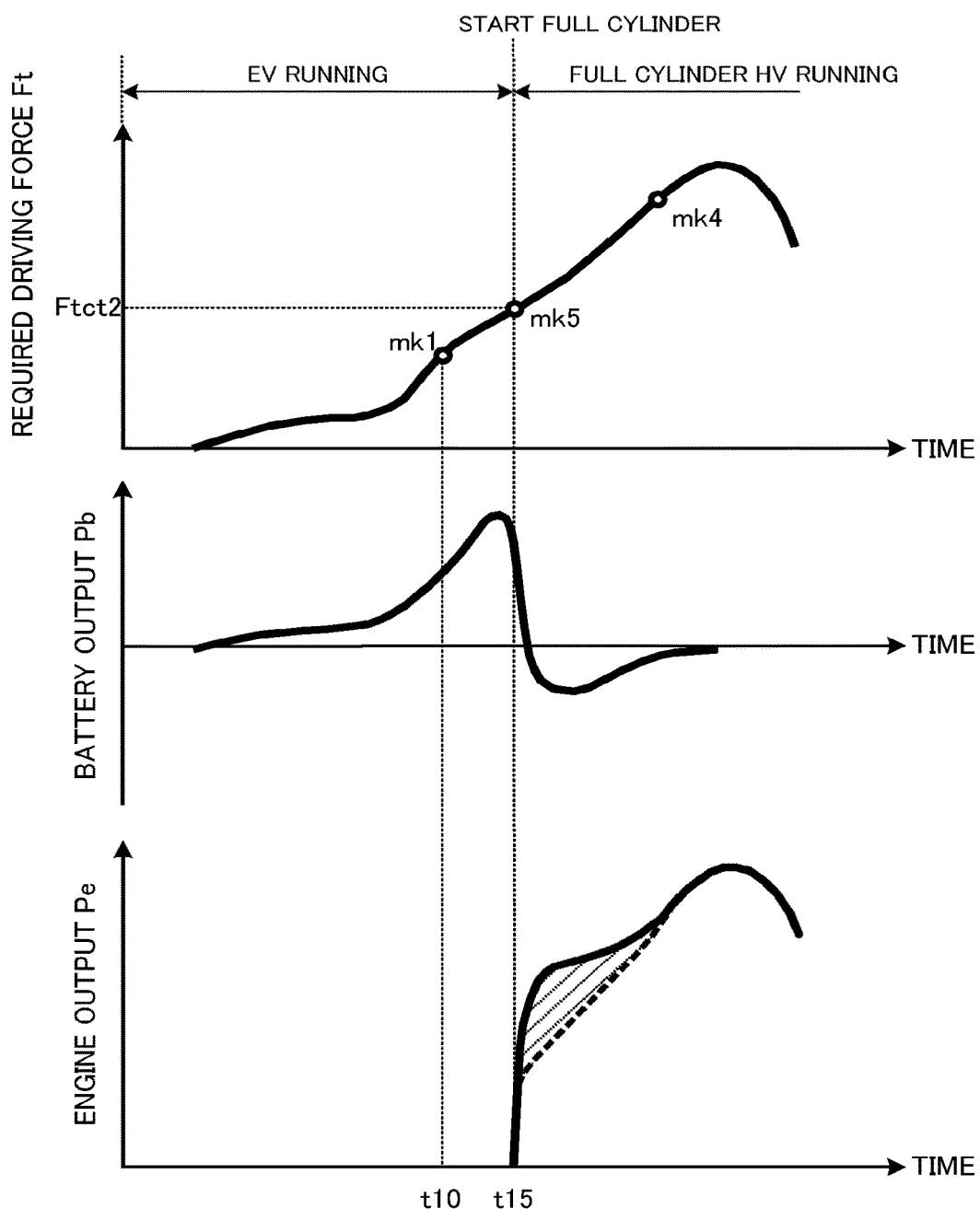
FIG. 9 is a timing chart regarding engine start timing at the stop of a full cylinder operation.

Next, with reference to FIG. 9, a state at the stop of the full cylinder operation will be explained. FIG. 9 is a timing chart regarding engine start timing at the stop of the full cylinder operation. In FIG. 9, the same parts as those in FIG. 7 will carry the same reference numerals, and an explanation thereof will be omitted, as occasion demands.

FIG. 9, as in FIG. 7, exemplifies respective time transitions of the required driving force Ft, the battery output Pb, and the engine output Pe, in the implementation period of the EV running engine start control.

In FIG. 9, if the engine 200 is stopped in the full cylinder operation, the engine 200 is not started at a time point t10, which is the star time point at the stop of the cylinder deactivation operation (refer to a marker mk1) illustrated in FIG. 7. In other words, the EV running period is lengthened. At a time point t15, if the required driving force Ft reaches the second start threshold value Ftct2, the engine 200 is started in the full cylinder operation (refer to a marker mk5). Then, the full cylinder HV running is continued (refer to a marker mk4 illustrated).

On the other hand, if the engine 200 is started in the full cylinder operation at the time point t15, the engine output Pe is controlled as illustrated in a solid line.

Here, the time transition exemplified in a dashed line illustrated is a transition of the engine output according to the required driving force Ft. After the start in the full cylinder operation, in a reasonable period, the engine 200 is operated on a higher output side than this engine output. In other words, a hatched part illustrated corresponds to an increment of the power generation load of the motor generator MG1 (or one example of the action of the correcting device according to the present invention). Increase correction of the power generation load will be described later.

Figure 10:
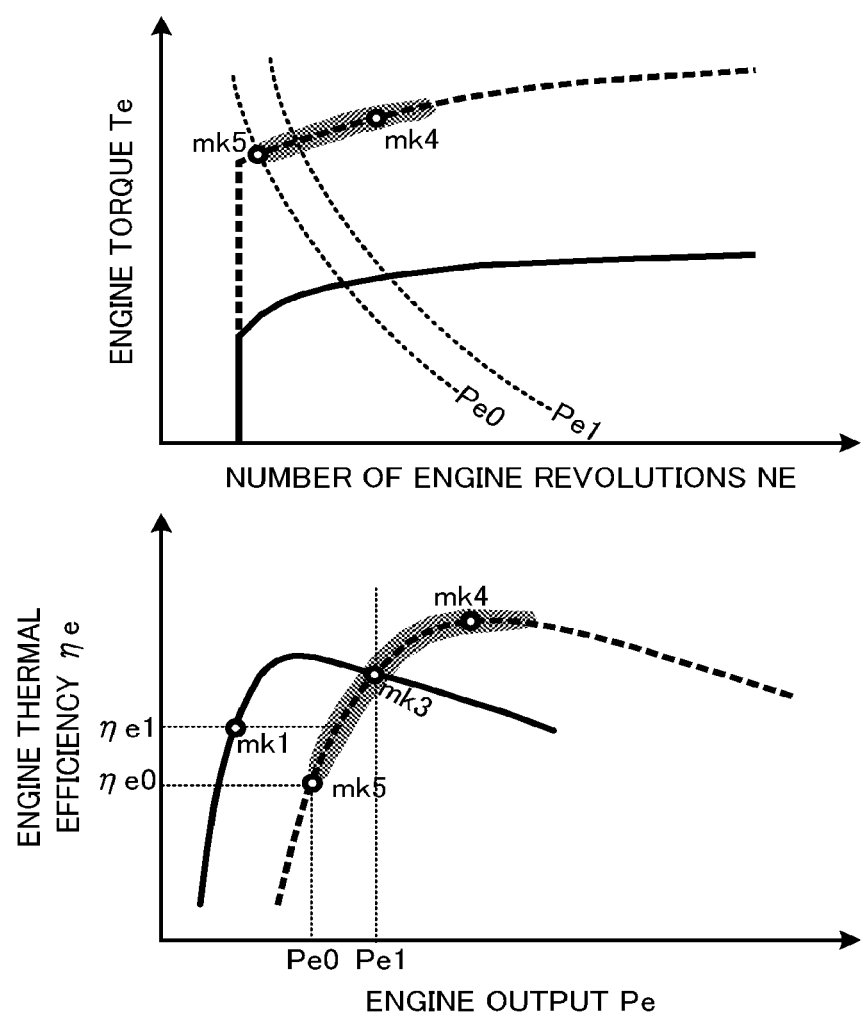
FIG. 10 is diagrams explaining a state of the engine corresponding to FIG. 9.

FIG. 10 is diagrams explaining the operating state of the engine corresponding to FIG. 9. In FIG. 10, the same parts as those in FIG. 9 will carry the same reference numerals, and an explanation thereof will be omitted, as occasion demands.

In FIG. 10, an upper part is a diagram explaining the operating point of the engine 200 defined by the number of engine revolutions NE and the engine torque Te, wherein a solid line indicates an optimum fuel efficiency operating line in the cylinder deactivation operation, and a dashed line indicates an optimum fuel efficiency operating line in the full cylinder operation. A lower part is a diagram exemplifying a relation between the engine output Pe and the engine thermal efficiency $\eta e$, wherein a solid line indicates a thermal efficiency characteristic line in the cylinder deactivation operation, and a dashed line indicates a thermal efficiency characteristic line in the full cylinder operation. Each diagram is accompanied by the same markers as those in FIG. 9, as occasion demands.

In FIG. 10, a transition of the operating point of the engine 200 is hatched on each of the optimum fuel efficiency operating line and the thermal efficiency characteristic line.

As described above, at the second start threshold value Ftct2 at which the engine 200 that is stopped in the full cylinder operation is started, the efficiency during the full cylinder HV running is substantially equal to the efficiency during the EV Running. Here, at the stop of the cylinder deactivation, the engine 200 is started with an engine output at which the engine thermal efficiency $\eta e$ is $\eta e1$. On the other hand, at the stop of the full cylinder operation, the engine 200 is started with an engine output Pe0 at which the engine thermal efficiency $\eta e$ is $\eta e0$ ($\eta e0 < \eta e1$)

This is because the efficiency during the EV running tends to be reduced in a range on a higher output side than the start point at the stop of the cylinder deactivation, and because the efficiency during the full cylinder HV running is higher than the efficiency during the EV running at the time point at which the engine thermal efficiency is $\eta e0$.

On the other hand, in a range from the engine output Pe0 at which the engine 200 is started in the full cylinder operation to the engine output Pe1, the thermal efficiency of the engine 200 is higher in the case of the cylinder deactivation HV running. In other words, there is a possibility of reduction in fuel efficiency in exchange for suppressing the frequent switching of the operation aspect.

Thus, in the EV running engine start control, the power generation load by the motor generator MG1 is increased and corrected immediately after the start in the full cylinder operation. In other words, the engine output Pe is increased from the engine output Pe0 according to the original driving force requirement, to near the engine output Pe1 at which the engine thermal efficiency $\eta e$ in the cylinder deactivation operation is equal to the engine thermal efficiency $\eta e$ in the full cylinder operation. Therefore, the engine 200 that is started in the full cylinder operation is not operated in an operating area with extremely low thermal efficiency, and the reduction in fuel efficiency does not become apparent.

Particularly here, the measure of increasing the power generation load as described above is an effect specific to the control apparatus for the internal combustion engine according to the present invention.

In other words, in the EV running engine start control according to the embodiment, the engine start threshold value Vtct2 at the stop of the full cylinder operation is higher than the engine start threshold value Ftct1 at the stop of the cylinder deactivation. Thus, the EV running period is lengthened, and the SOC of the battery 12 is lower than the SOC when the engine start is performed at the first start threshold value Ftct1. Therefore, even if the engine output Pe is corrected to an increase side at the start of the full cylinder operation from the viewpoint of the thermal efficiency, and even if the generated power corresponding to the increased power generation load is used to charge the battery 12, there is no chance of failing to control the SOC of the battery 12.

The measure of increasing the power generation load as described above is effective even if the required output Pn of the hybrid vehicle 1 decreases immediately after the start in the full cylinder operation.

As described above, if the engine 200 is stopped in the full cylinder operation, the EV running is continued until the required driving force Ft reaches the second start threshold value Ftct2, and the internal combustion engine is started with the full cylinder operation maintained. There is thus no shift to the cylinder deactivation operation before the start and immediately after the start. Therefore, the frequency of switching the operation aspect can be reduced.

<Effect of EV Running Engine Start Control>

Next, with reference to FIG. 11 and FIG. 12, the state of the hybrid vehicle 1 will be explained in a comparative example used to be compared with the embodiment. Control in the comparative example is assumed to be such control that the operation aspect of the engine 200 at a previous stop time point is not reflected in an engine start condition during the EV running.

Figure 11:
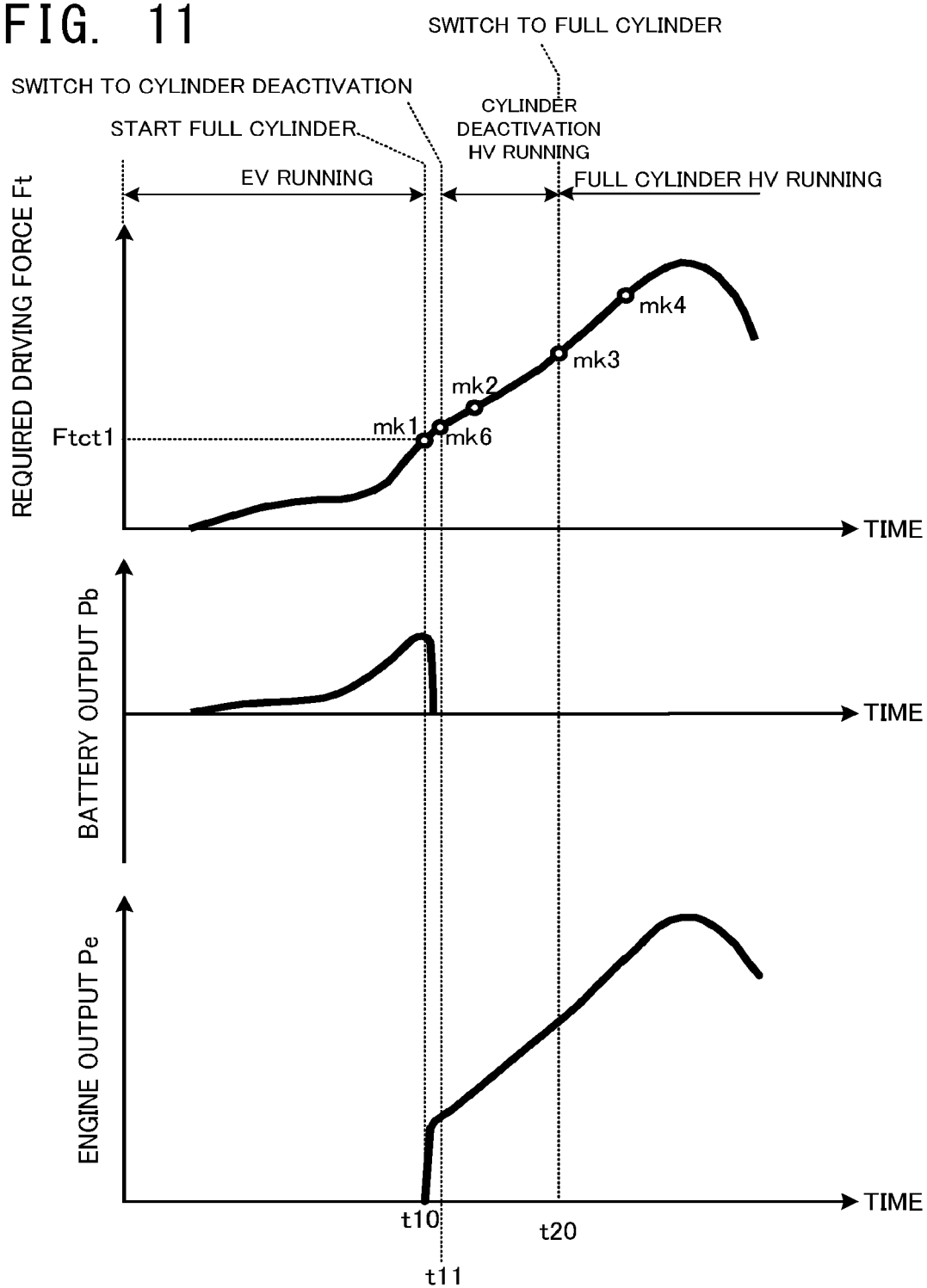
FIG. 11 is a timing chart regarding engine start timing at the stop of the full cylinder operation in a comparative example.

FIG. 11 is a timing chart regarding engine start timing at the stop of the full cylinder operation. In FIG. 11, the same parts as those in FIG. 7 will carry the same reference numerals, and an explanation thereof will be omitted, as occasion demands.

In the comparative example, at a time point t10, the required driving force Ft reaches the first start threshold value Ftct1, and the engine 200 is started in the full cylinder operation (refer to a marker mk1). At a time point t11 immediately after the start, the operation aspect of the engine 200 is switched from the full cylinder operation to the cylinder deactivation operation (refer to a marker mk6). Then, at a time point t20, the efficiency during the full cylinder HV running becomes greater than the efficiency during the cylinder deactivation HV running, and the operation aspect is switched again to the full cylinder operation. In other words, in a short period immediately after the start, the operation aspect of the engine 200 is frequently switched, which results in giving the driver discomfort.

Figure 12:
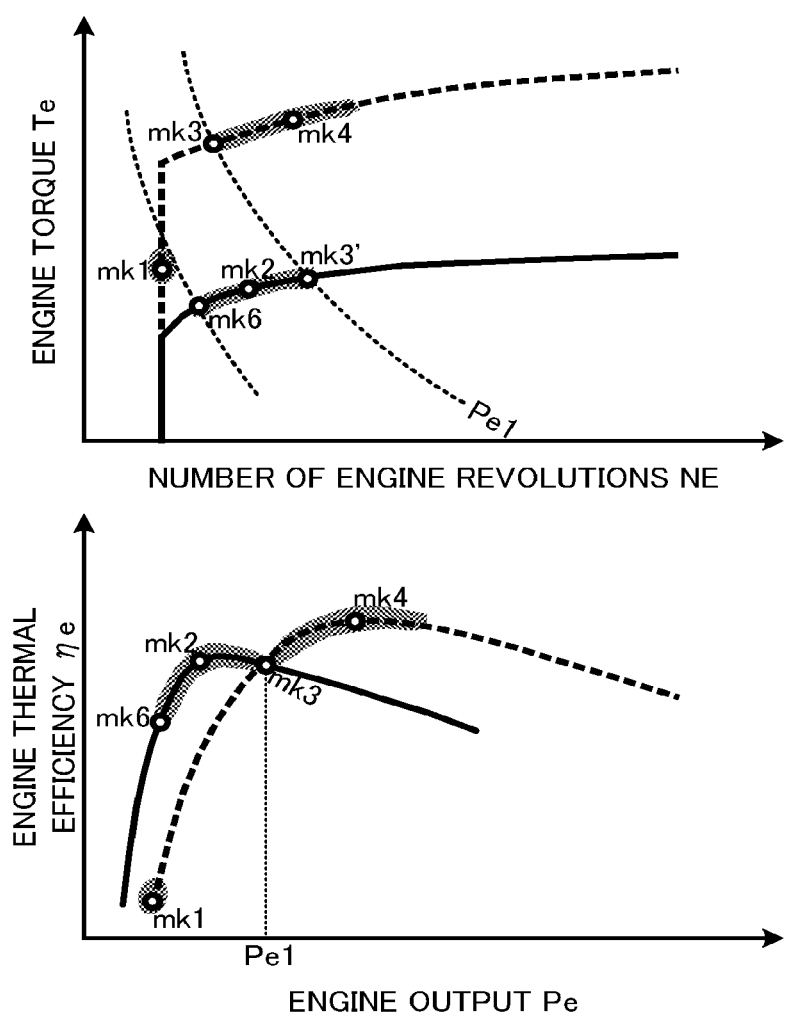
FIG. 12 is diagrams explaining a state of the engine corresponding to FIG. 11.

FIG. 12 is diagrams explaining the operating state of the engine corresponding to FIG. 11. In FIG. 12, the same parts as those in FIG. 11 will carry the same reference numerals, and an explanation thereof will be omitted, as occasion demands.

In FIG. 12, an upper part is a diagram explaining the operating point of the engine 200 defined by the number of engine revolutions NE and the engine torque Te, wherein a solid line indicates an optimum fuel efficiency operating line in the cylinder deactivation operation, and a dashed line indicates an optimum fuel efficiency operating line in the full cylinder operation. A lower part is a diagram exemplifying a relation between the engine output Pe and the engine thermal efficiency ηe, wherein a solid line indicates a thermal efficiency characteristic line in the cylinder deactivation operation, and a dashed line indicates a thermal efficiency characteristic line in the full cylinder operation. Each diagram is accompanied by the same markers as those in FIG. 11, as occasion demands. Moreover, in FIG. 12, a transition of the operating point of the engine 200 is hatched on each of the optimum fuel efficiency operating line and the thermal efficiency characteristic line.

As is clear from FIG. 12, if the engine 200 is started in the full cylinder operation with an engine output corresponding to the first start threshold value Ftct1, the engine thermal efficiency ηe is extremely reduced. It is thus necessary to switch to the cylinder deactivation operation immediately after the start. In other words, if the operation aspect of the engine 200 at a previous stop is not reflected in the engine start condition during the EV running, that necessarily causes the frequent switching of the operation aspect.

According to the EV running engine start control according to the embodiment, the problems associated with the frequency switching of the operation aspect as described above are found, and the operation aspect of the engine 200 at the previous stop is reflected in the EV running engine start control. It is therefore possible to prevent the various problems associated with the frequency switching of the operation aspect (here, causing the discomfort associated with the combustion noise). Moreover, particularly in the embodiment, the engine 200 is operated at the operating point with good thermal efficiency, immediately after the start of the full cylinder operation, by using the reduction in SOC of the battery 12 due to the lengthened EV running period. It is therefore practically beneficial in terms of fuel efficiency.

Even if the power regeneration amount by the motor generator MG2 is high, such as if there are many braking opportunities, the EV running engine start control according to the embodiment is effective. For example, in this case, the reduction in SOC of the battery 12 is moderated, and the efficiency during the EV running thus increases. As a result, necessarily, each of the first and second start threshold values is shifted to a higher output side.

Therefore, at the stop in the full cylinder operation, the EV running period is further lengthened. It is obvious that such a lengthened EV running period does not cause the frequent switching of the operation aspect of the engine 200. Moreover, at the stop in the cylinder deactivation operation, the torque assist can be actively performed by the motor generator MG2 after the start in the cylinder deactivation operation. Such active assist allows the engine 200 to be operated at the operating point with good thermal efficiency as long as possible, and thus, necessarily, it is hard to switch to the full cylinder HV running mode. In other words, it is obvious that the active assist does not cause the frequent switching of the operation aspect of the engine 200.

The hybrid vehicle 1 according to the embodiment is of a so-called two motor hybrid type, which is provided with two motor generators of the motor generators MG1 and MG2. However, as long as the switching between the EV running and the HV running can be performed, a physical configuration of the hybrid drive apparatus is not limited. For example, the control apparatus for the internal combustion engine according to the present invention can be also applied to a one motor hybrid type hybrid vehicle provided with a stepped transmission.

The present invention is not limited to the aforementioned embodiments, but various changes may be made, if desired, without departing from the essence or spirit of the invention which can be read from the claims and the entire specification. A control apparatus for an internal combustion engine that involves such changes is also intended to be within the technical scope of the present invention.

INDUSTRIAL APPLICABILITY

The present invention can be applied to control the running of the hybrid vehicle having the internal combustion engine configured to switch the operation aspect between the full cylinder operation and the cylinder deactivation operation.

DESCRIPTION OF REFERENCE NUMERALS 1 hybrid vehicle
10 hybrid drive apparatus
11 PCU
12 battery
MG1, MG2 motor generator
100 ECU
200 engine
300 power dividing mechanism
400 input shaft
500 drive shaft
600 speed reduction mechanism

The invention claimed is:

1. A control apparatus for an internal combustion engine, configured to control an internal combustion engine in a hybrid vehicle, the hybrid vehicle comprising, as a power source: the internal combustion engine that can switch an operation aspect between a full cylinder operation that allows all cylinders to be in an operating state and a cylinder deactivation operation that allows a part of the cylinders to be rested; and at least one rotary electric machine that can perform power running and regeneration, said control apparatus comprising:
a specifying device configured to specify the operation aspect at a previous stop time point of the internal combustion engine in an EV running period in which the internal combustion engine is in a stop state;
a first start controlling device configured to start the internal combustion engine in the cylinder deactivation operation at a time point at which a required output corresponding value of the hybrid vehicle is a first reference value, if the specified operation aspect is the cylinder deactivation operation; and
a second start controlling device configured to continue EV running at a time point at which the required output corresponding value is the first reference value and to start the internal combustion engine in the full cylinder operation at a time point at which the required output corresponding value is a second reference value, which is greater than the first reference value, if the specified operation aspect is the full cylinder operation.

2. The control apparatus for the internal combustion engine according to claim 1, wherein
the first reference value is the required output corresponding value at which efficiency of the hybrid vehicle during cylinder deactivation operation HV running accompanied by the cylinder deactivation operation is greater than or equal to efficiency of the hybrid vehicle during the EV running, and the second reference value is the required output corresponding value at which efficiency of the hybrid vehicle during full cylinder operation HV running accompanied by the full cylinder operation is greater than or equal to the efficiency of the hybrid vehicle during the EV running.

3. The control apparatus for the internal combustion engine according to claim 1, further comprising a correcting device configured to increase and correct a power generation load of the rotary electric machine with respect to a reference value if the internal combustion engine is started in the full cylinder operation.

4. The control apparatus for the internal combustion engine according to claim 1, wherein the required output corresponding value is a required output or a required driving force.

* * * * *